US011933341B2

United States Patent
Rowley (10) Patent No.: US 11,933,341 B2
(45) Date of Patent: Mar. 19, 2024

(54) THREADED INSERT WITH A REPLACEABLE NUT ELEMENT

(71) Applicant: Mark David Rowley, Friendswood, TX (US)

(72) Inventor: Mark David Rowley, Friendswood, TX (US)

( * ) Notice: Subject to any disclaimer, the term of this patent is extended or adjusted under 35 U.S.C. 154(b) by 270 days.

(21) Appl. No.: 17/240,854

(22) Filed: Apr. 26, 2021

(65) Prior Publication Data

US 2022/0341460 A1 Oct. 27, 2022

(51) Int. Cl.
*F16B 37/12* (2006.01)

(52) U.S. Cl.
CPC .................. *F16B 37/125* (2013.01)

(58) Field of Classification Search
CPC ..... F16B 37/125; F16B 37/044; F16B 37/122
USPC .................. 411/277, 171, 103, 108
See application file for complete search history.

(56) References Cited

U.S. PATENT DOCUMENTS

| | | | | |
|---|---|---|---|---|
| 2,783,811 A * | 3/1957 | Cummaro | ............... | F16B 39/06 411/968 |
| 2,877,817 A * | 3/1959 | Rockwell | .............. | F16B 37/122 411/965 |
| 3,063,765 A * | 11/1962 | Huff | ......................... | F16B 12/52 248/188.8 |
| 3,180,387 A * | 4/1965 | Dzus | ..................... | F16B 5/0208 411/968 |
| 3,938,209 A * | 2/1976 | Hattan | .................... | F16B 37/12 411/277 |
| 4,227,561 A * | 10/1980 | Molina | ................. | F16B 37/044 411/103 |
| 4,616,967 A * | 10/1986 | Molina | ................. | F16B 5/0208 411/105 |
| 4,863,326 A * | 9/1989 | Vickers | ................. | F16B 41/002 411/105 |
| 4,890,964 A * | 1/1990 | Lindley | ................... | F16B 39/36 411/324 |
| 4,964,594 A * | 10/1990 | Webb | ...................... | F16B 37/14 411/103 |
| 4,973,208 A * | 11/1990 | Gauron | ................... | F16B 5/025 411/258 |
| 5,137,406 A * | 8/1992 | Cosenza | .............. | F16B 37/044 411/113 |

(Continued)

OTHER PUBLICATIONS

Pitstopusa, Allstar Performance Aluminum Threaded Nut Insert, pitstopusa.com.

*Primary Examiner* — William D Hutton, Jr.
*Assistant Examiner* — Dil K. Magar (57) ABSTRACT

A threaded insert with a replaceable nut element allows a user to replace only the nut element of the threaded insert rather than the entire threaded insert. The threaded insert includes an insertable housing, a replaceable nut, a retaining mechanism, and an attachment mechanism. The insertable housing allows the threaded insert to be engaged within a wall structure and is used to contain the replaceable nut. The replaceable nut allows the threaded insert to be engaged by a fastener such as a screw or bolt. The attachment mechanism allows the replaceable nut to be attached within and detached from the insertable housing. The retaining mechanism further secures the replaceable nut within the insertable housing and also prevents the replaceable nut from rotating within the insertable housing.

11 Claims, 6 Drawing Sheets

(56) References Cited

U.S. PATENT DOCUMENTS

| | | | | |
|---|---|---|---|---|
| 5,378,099 | A * | 1/1995 | Gauron | F16B 5/01 |
| | | | | 411/258 |
| 5,405,228 | A * | 4/1995 | Reid | F16B 37/044 |
| | | | | 411/113 |
| 5,632,582 | A * | 5/1997 | Gauron | F16B 5/01 |
| | | | | 411/258 |
| 6,183,180 | B1 * | 2/2001 | Copple | F16B 37/044 |
| | | | | 411/113 |
| 7,195,436 | B1 * | 3/2007 | Stephen | F16B 11/006 |
| | | | | 411/376 |
| 8,757,665 | B2 | 6/2014 | Drapes et al. | |
| 8,845,321 | B2 | 9/2014 | Neter | |
| 9,206,832 | B1 * | 12/2015 | Maddux | F16B 37/14 |
| 10,047,784 | B2 | 8/2018 | Yamaguchi | |
| 2006/0013671 | A1 | 1/2006 | Lauderbaugh | |
| 2007/0212193 | A1 * | 9/2007 | Wang | F16B 37/061 |
| | | | | 411/171 |
| 2008/0056809 | A1 * | 3/2008 | Kielczewski | F16B 5/0233 |
| | | | | 403/118 |
| 2009/0123220 | A1 * | 5/2009 | Chou | F16B 37/043 |
| | | | | 403/21 |
| 2011/0008125 | A1 * | 1/2011 | Moon | F16B 5/02 |
| | | | | 411/108 |
| 2014/0301803 | A1 * | 10/2014 | Haas | F16D 1/02 |
| | | | | 411/103 |
| 2017/0082125 | A1 * | 3/2017 | Richardson | F16B 5/0208 |
| 2017/0343033 | A1 * | 11/2017 | Sarazin | F16B 33/002 |
| 2019/0219092 | A1 * | 7/2019 | Bentrim | F16B 37/068 |
| 2020/0040933 | A1 * | 2/2020 | Miller | F16B 37/145 |
| 2020/0240459 | A1 * | 7/2020 | Figge | F16B 43/00 |
| 2020/0291983 | A1 * | 9/2020 | Size, Jr. | F16B 5/0241 |

* cited by examiner

THREADED INSERT WITH A REPLACEABLE NUT ELEMENT

FIELD OF THE INVENTION

The present invention relates generally to threaded inserts. More specifically, the present invention is a threaded insert with a replaceable nut element that allows a user to replace only the nut element of the threaded insert rather than the entire threaded insert.

BACKGROUND OF THE INVENTION

Threaded inserts have been used worldwide for many years to provide accurate and durable threads in parts used in bolted assemblies. Because parent materials such as aluminum are soft in comparison to harder materials like steel, drilling and tapping threads into softer parent materials can result in a bolted connection whose strength is limited to the thread tear-out strength of the parent material. Thus, threaded inserts are used because they result in a stronger bolted joint than simply tapping into the parent material.

In their simplest configuration, threaded inserts are cylindrical metal (typically steel), threaded internally to accept a mating bolt. If used in plastics, the external diameter may be knurled or grooved such that the insert is mechanically gripped by the plastic; inserts can be molded into the plastic part or can be installed in plastic parts after molding by various processes including but not limited to press-fit, ultrasonic installation, or adhesive installation. If used in metal parts, the insert external diameter can be threaded for installation into an appropriately tapped hole in the parent material. To prevent rotation of the insert during mating bolt tightening or loosening, the insert can be installed with thread-locking adhesive, or the insert can be equipped with keys that are driven into the parent metal to prevent movement ("key-locked insert").

One drawback of threaded inserts is that if the internal threads become damaged, removal and replacement of the entire insert becomes necessary. Insert removal can be damaging to the part from which the insert is being removed and can create debris that may not be acceptable in certain service environments. For example, the typical removal procedures for a standard key-locked insert involve drilling into the insert to a specific depth, bending the keys, and unscrewing the insert from the part, followed by installation of a new insert. There exists a need for an invention to eliminate the messy and potentially damaging removal process altogether.

It is therefore an objective of the present invention to provide a threaded insert with a replaceable nut element that allows a user to only replace the nut element of the threaded insert rather than the entire threaded insert if the internal threading of the nut element has decayed or been damaged. The present invention includes an attachment mechanism that allows a replaceable nut to be attached within or detached from an insertable housing. The attachment mechanism also prevents the replaceable nut from axially moving within the insertable housing. Further, the present invention includes a retaining mechanism which further secures the replaceable nut within the insertable housing by preventing the replaceable nut from rotating when within the insertable housing. Through this arrangement, the user can easily replace the replaceable nut with another when necessary.

DETAIL DESCRIPTIONS OF THE INVENTION

All illustrations of the drawings are for the purpose of describing selected versions of the present invention and are not intended to limit the scope of the present invention.

In reference to FIGS. 1 through 6, the present invention is a threaded insert with a replaceable nut element that allows a user to replace only the nut element of the threaded insert rather than the entire threaded insert. In the preferred embodiment, the present invention comprises an insertable housing 1, a replaceable nut 12, a retaining mechanism 19, and an attachment mechanism 28. The insertable housing 1 allows the present invention to be engaged within a wall structure and is used to contain the replaceable nut 12. The replaceable nut 12 allows the present invention to be engaged by a fastener such as a screw or bolt. The attachment mechanism 28 allows the replaceable nut 12 to be attached within and detached from the insertable housing 1. The retaining mechanism 19 further secures the replaceable nut 12 within the insertable housing 1 and also prevents the replaceable nut 12 from rotating within the insertable housing 1 when the present invention is being engaged by a fastener.

Figure 1:
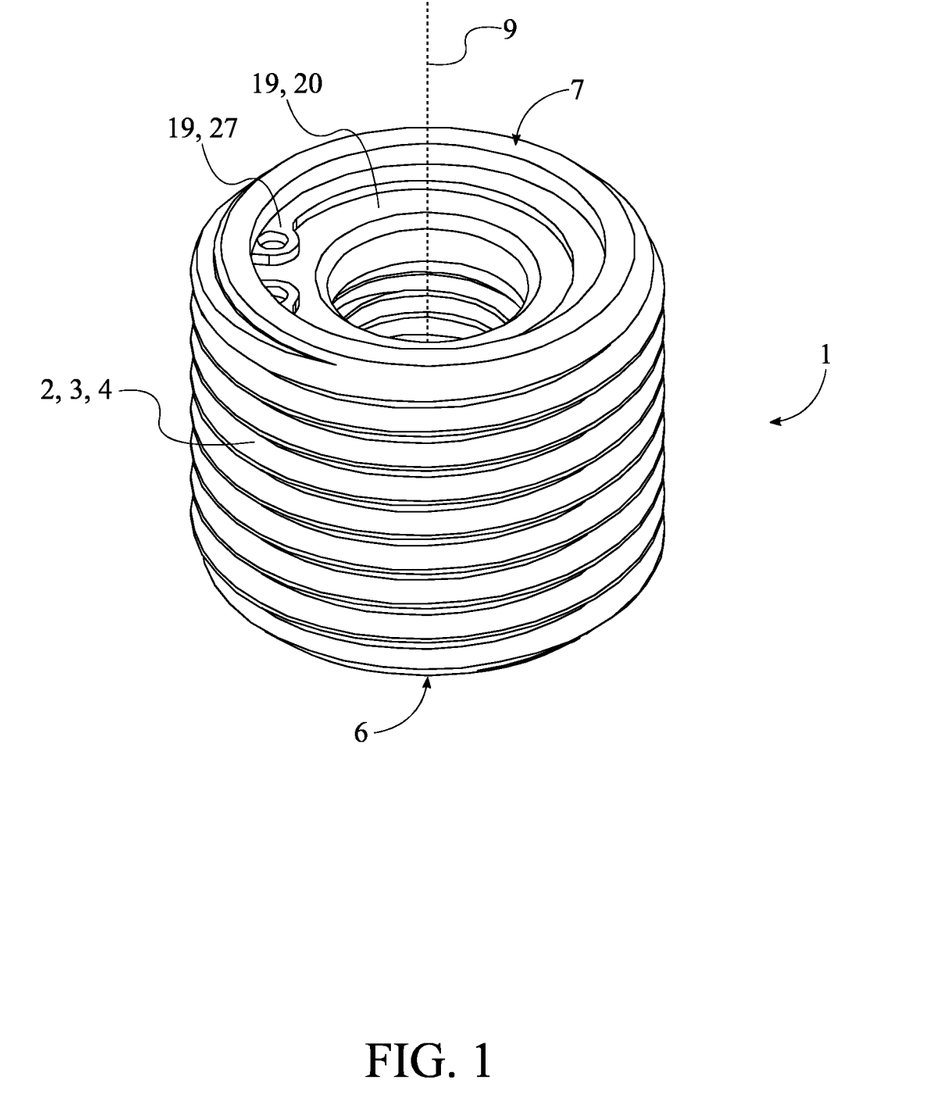
FIG. 1 is a front top perspective view of the present invention.
Figure 2:
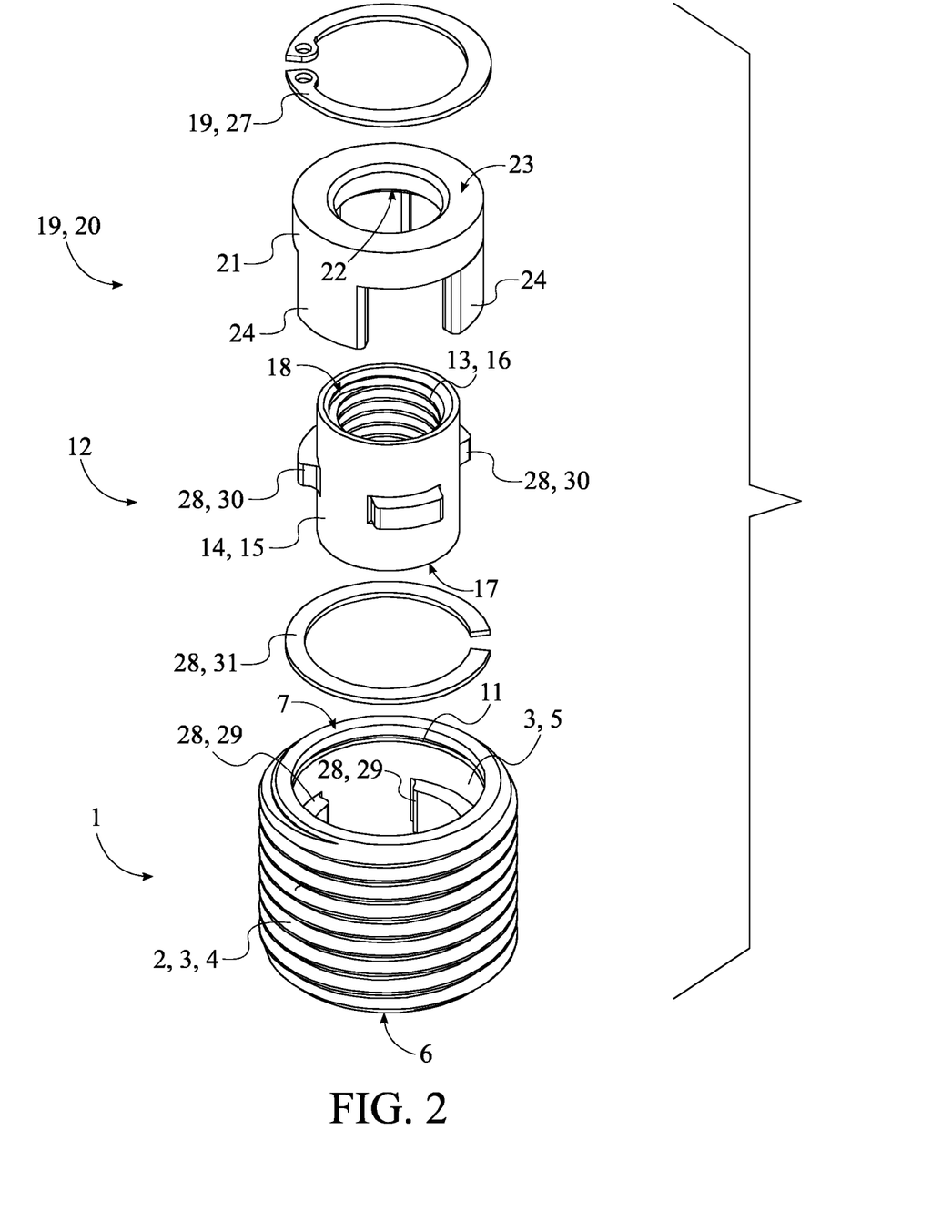
FIG. 2 is an exploded front top perspective view of the present invention.
Figure 3:
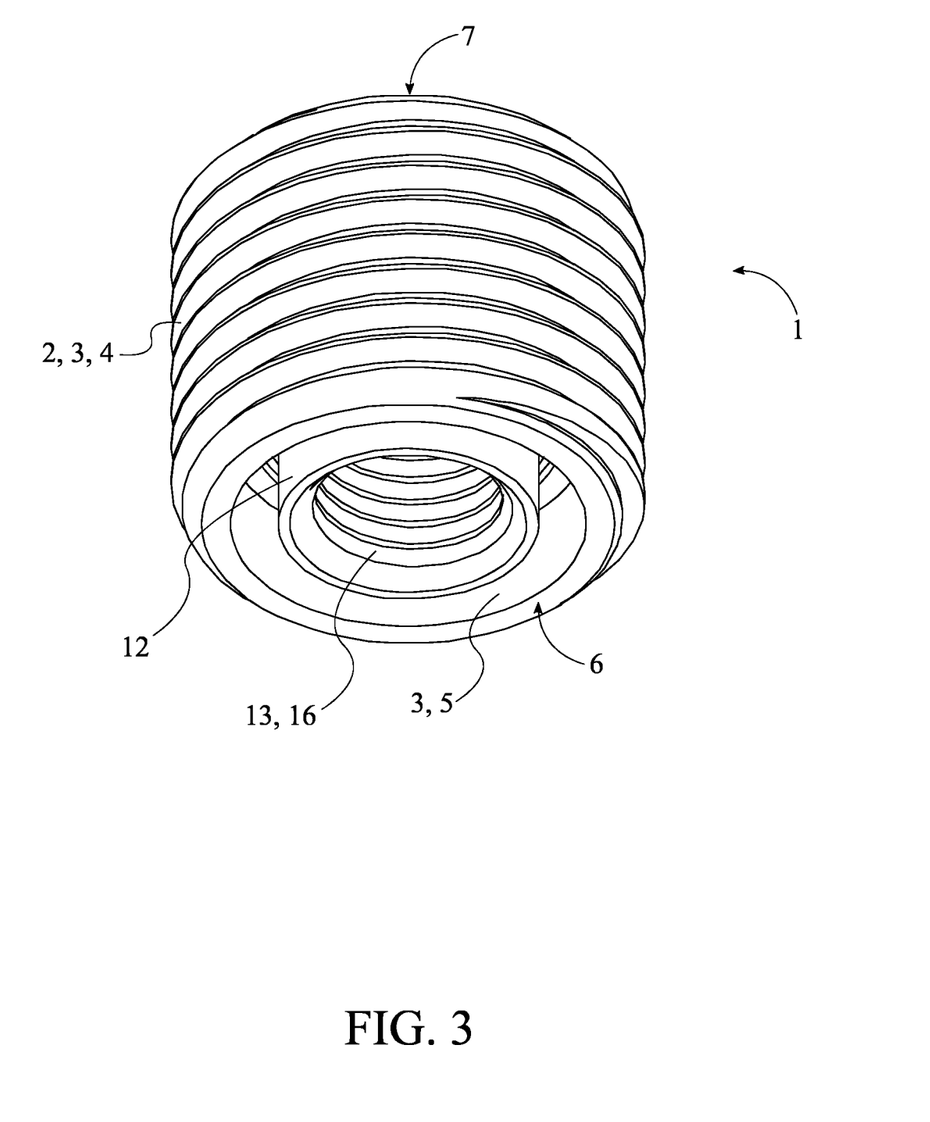
FIG. 3 is a front bottom perspective view of the present invention.

The general configuration of the aforementioned components allows a user to replace only the nut element of the threaded insert rather than the entire threaded insert. With reference to FIGS. 1 and 2, the insertable housing 1 comprises a grip feature 2 and a housing tubular body 3. The grip feature 2 creates friction between the insertable housing 1 and the wall structure in order to secure the insertable housing 1 within a wall structure and to prevent the insertable housing 1 from rotating within the wall structure. The grip feature 2 can be various types of gripping elements such as, but not limited to, a knurled surface, a grooved surface, or a threaded surface. The replaceable nut 12 comprises a nut threading 13 and a nut tubular body 14. The nut threading 13 allows the replaceable nut 12 to be engaged by a threaded fastener. The housing tubular body 3 comprises an outer housing surface 4, an inner housing surface 5, a first housing end 6, and a second housing end 7. The nut tubular body 14 comprises an outer nut surface 15, an inner nut surface 16, a first nut end 17, and a second nut end 18. The grip feature 2 is integrated around the outer housing surface 4 in order for the grip feature 2 to make direct contact with the inside of the wall structure. Thus, the insertable housing 1 is secured within the wall structure and is prevented from rotating when within the wall structure. The nut threading 13 is connected around the inner nut surface 16 in order to allow the replaceable nut 12 to be engaged by a threaded fastener as standard procedure. The inner housing is positioned around the outer nut surface 15 in order for the insertable housing 1 to effectively contain the replaceable nut 12. The attachment mechanism 28 is operatively coupled in between the replaceable nut 12 and the insertable housing 1, wherein the insertable housing 1 is used to selectively prevent axial movement of the replaceable nut 12 within the insertable housing 1. In more detail, the attachment mechanism 28 allows replaceable nut 12 to be attached within or detached from the insertable housing 1. Moreover, a user can detach the replaceable nut 12 from the insertable housing 1 in order to solely replace the replaceable nut 12 with another if the threading of the replaceable nut 12 has decayed or been damaged. The retaining mechanism 19 is operatively coupled between the replaceable nut 12 and the insertable housing 1, wherein the retaining mechanism 19 is used to selectively prevent rotational movement of the replaceable nut 12 within the insertable housing 1. In more detail, the retaining mechanism 19 further secures the replaceable nut 12 within the insertable housing 1. The retaining mechanism 19 must first be detached in order for the replaceable nut 12 to be detached from the insertable housing 1. Further, the retaining mechanism 19 prevents the replaceable nut 12 from rotating when engaged by a fastener while a torque force is applied to the fastener.

In order for the replaceable nut 12 to be selectively attached within the insertable housing 1 and with reference to FIG. 2, the attachment mechanism 28 comprises a plurality of housing protrusions 29, a plurality of nut protrusions 30, and a first retaining ring 31. The first retaining ring 31 is attached around the inner housing surface 5, adjacent to the first housing end 6. This arrangement allows the first retaining ring 31 to prevent the replaceable nut 12 from falling through the insertable housing 1. The plurality of housing protrusions 29 is radially connected around the inner housing surface 5 and is positioned offset from the first retaining ring 31, opposite to the first housing end 6. This arrangement allows the plurality housing protrusions to interface with the plurality of nut protrusions 30 when the replaceable nut 12 is within the insertable housing 1. Further, the plurality of nut protrusions 30 is radially connected to the outer nut surface 15. This arrangement allows the plurality of nut protrusions 30 to be easily inserted within the insertable housing 1 to interface with the plurality of housing protrusions 29.

Figure 6:
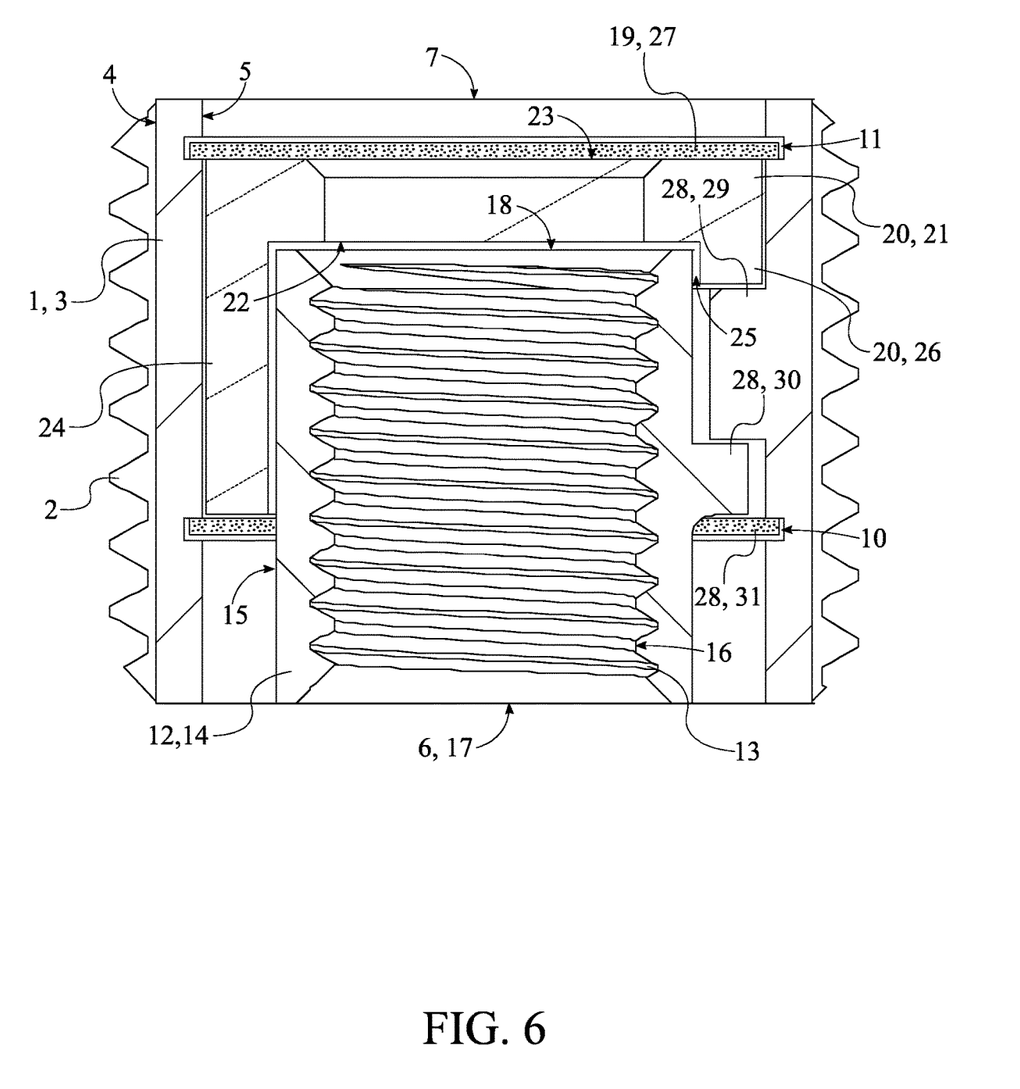
FIG. 6 is a cross-sectional view of the present invention taken along line 6-6 from FIG. 5.

The insertable housing 1 and the replaceable nut 12 can be arranged in an axial-locked configuration. With reference to FIG. 6, the plurality of nut protrusions 30 is positioned in between the first retaining ring 31 and the plurality of housing protrusions 29, and each of the plurality of housing protrusions 29 is positioned adjacent to a corresponding nut protrusion from the plurality of nut protrusions 30. Through this arrangement, the first retaining ring 31 and the plurality of housing protrusions 29 prevent the replaceable nut 12 from axially moving through the insertable housing 1. In order to establish the axial-locked configuration, the replaceable nut 12 is inserted within the insertable housing 1. The plurality of nut protrusions 30 slide through a set of housing channels formed by the plurality of housing protrusions 29 as the replaceable nut 12 is inserted within the insertable housing 1. Once the plurality of nut protrusions 30 slides through the set of housing channels and reaches the first retaining ring 31, the replaceable nut 12 is rotated in order to position the plurality of housing protrusions 29 adjacent to the plurality of nut protrusions 30. Thus, the replaceable nut 12 is prevented from axially moving through the insertable housing 1 by the plurality of housing protrusions 29 and the first retaining ring 31.

Figure 4:
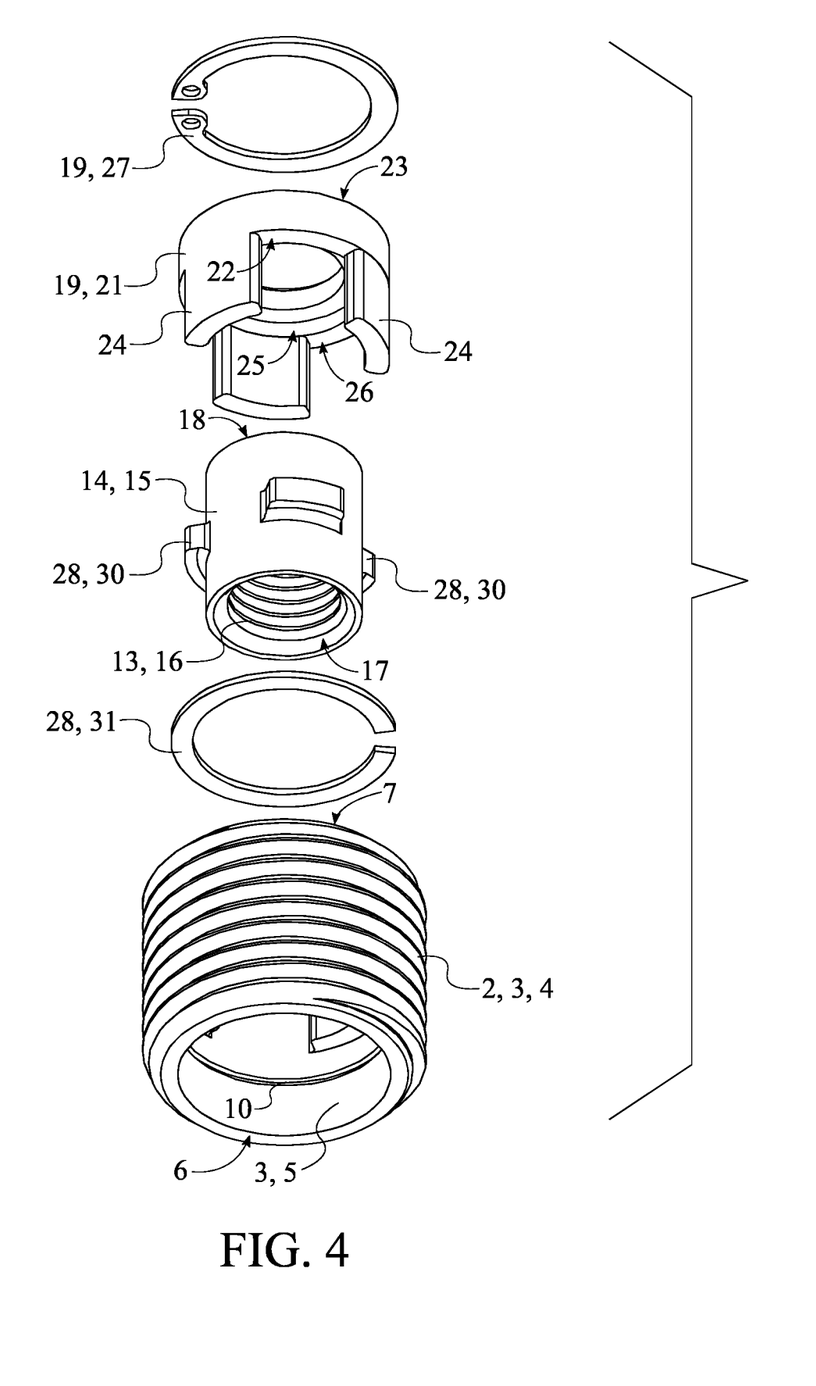
FIG. 4 is an exploded front bottom perspective view of the present invention.
Figure 5:
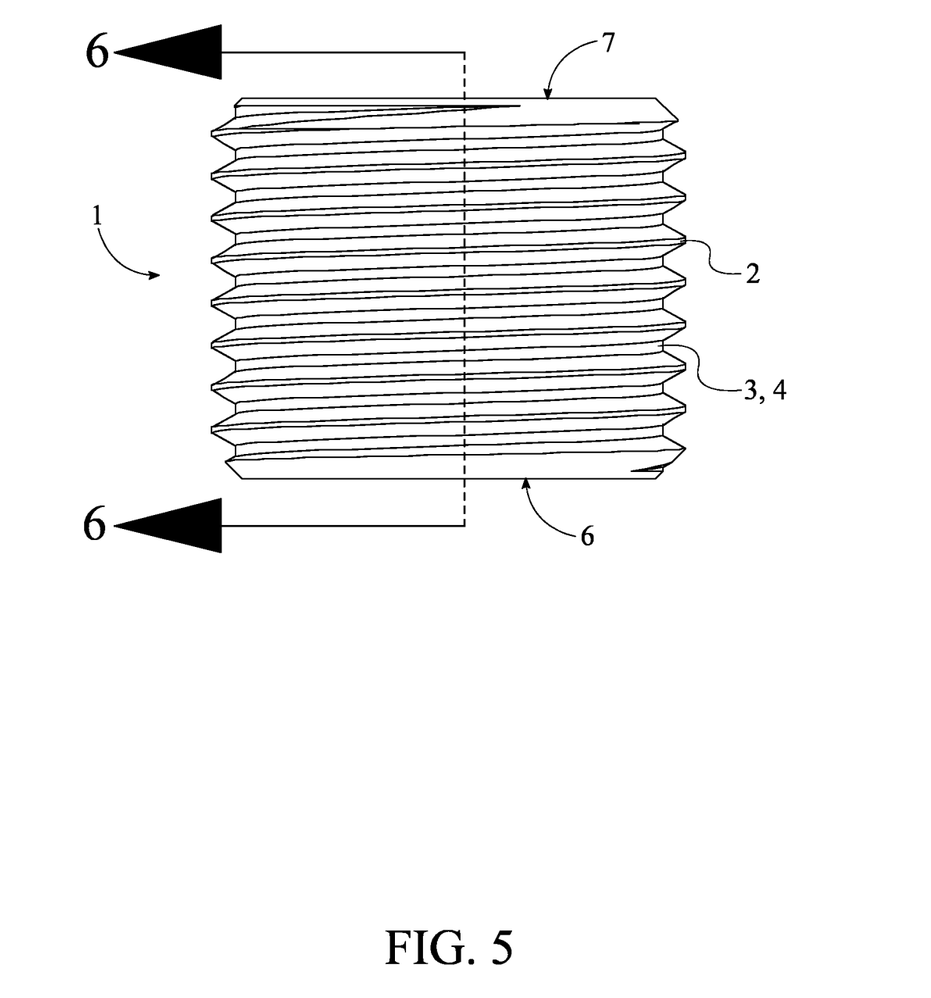
FIG. 5 is a front view of the present invention.

In order to maintain the first retaining ring 31 in place within the insertable housing 1 and with reference to FIGS. 4 and 6, the insertable housing 1 may further comprise a first annular channel 10. The first annular channel 10 is integrated around the inner housing surface 5, adjacent to the first housing end 6 in order to easily receive the first retaining ring 31. The first retaining ring 31 is engaged into the first annular channel 10. This arrangement prevents the first retaining ring 31 from axially moving when positioned within the insertable housing 1.

Alternatively, the first retaining ring 31 can be substituted with an internal ring-shaped inward protrusion that is machined integral to the insertable housing 1, or by some other type of annular or hollow cylindrical component that is screwed, press-fit or otherwise installed adjacent to the first housing end 6.

In order to further secure the replaceable nut 12 within the insertable housing 1 and with reference to FIG. 4, the retaining mechanism 19 comprises a keeper 20 and a second retaining ring 27. The keeper 20 further secures the replaceable nut 12 within the insertable housing 1 by preventing the replaceable nut 12 from rotating within the insertable housing 1. The second retaining ring 27 maintains the keeper 20 in place within the insertable housing 1. The keeper 20 comprises an annular body 21 and a plurality of prongs 24. The annular body 21 comprises a first annular base 22 and a second annular base 23. The plurality of prongs 24 is radially connected around the first annular base 22 and each of the plurality of prongs 24 is positioned normal to the first annular base 22. This arrangement allows the plurality of prongs 24 to slide past the housing channels formed by the plurality of housing protrusions 29 as the keeper 20 is inserted into the insertable housing 1. Furthermore, this arrangement allows the keeper 20 to prevent the replaceable nut 12 from rotating and, thus, the replaceable nut 12 is further secured within the insertable housing 1. Moreover, the second retaining ring 27 is attached around the inner housing surface 5, adjacent to the second housing end 7. This arrangement allows the second retaining ring 27 to prevent the keeper 20 from falling out of the insertable housing 1 through the second housing end 7.

The insertable housing 1 and the replaceable but can be arranged in a rotationally-locked configuration. With reference to FIGS. 4 and 6, each of the plurality of nut protrusions 30 is positioned in between a corresponding pair of prongs from the plurality of prongs 24 in order to prevent the replaceable nut 12 from rotating within the insertable housing 1, and thus, the replaceable nut 12 cannot be removed from the insertable housing 1. Further, the second annular base 23 is positioned against the second retaining ring 27, opposite to the second housing end 7, and the first annular base 22 is pressed against the plurality of housing protrusions 29, opposite to the first retaining ring 31. This arrangement prevents the keeper 20 from axially moving within the insertable housing 1. Moreover and in order to prevent any axial load from being transferred from the replaceable nut 12 to the keeper 20 and to the second retaining ring 27, the keeper 20 comprises a cylindrical cavity 25 and the cylindrical cavity 25 comprises a cavity base 26. The cylindrical cavity 25 traverses into the first annular base 22 in order to receive a portion of the replaceable nut 12. The second nut end 18 is positioned into the cylindrical cavity 25 and is positioned offset from cavity base 26. Through this arrangement, the second nut end 18 does not directly contact the keeper 20, and thus, any axial load from the replaceable nut 12 is not transferred to the keeper 20 and to the second retaining ring 27.

In order to maintain the second retaining ring 27 in place within the insertable housing 1 and with reference to FIGS. 2 and 6, the insertable housing 1 may further comprise a second annular channel 12. The second annular channel 12 is integrated around the inner housing surface 5, adjacent to the second housing end 7 in order to easily receive the second retaining ring 27. The second retaining ring 27 is engaged into the second annular channel 12. This arrangement prevents the second retaining ring 27 from axially moving when positioned within the insertable housing 1.

In order to replace the replaceable nut 12 with another when necessary, the retaining mechanism 19 must first be removed from the insertable housing 1. The second retaining ring 27 must be removed from the insertable housing 1. This allows the keeper 20 to be removed from the insertable housing 1. Without the keeper 20 within the insertable housing 1, the replaceable nut 12 can be rotated to align the plurality of nut protrusions 30 with the plurality of housing channels. The replaceable nut 12 can then be removed from the insertable housing 1 and a user can insert another replaceable nut 12 into the insertable housing 1.

In order for the insertable housing 1 to be further secured within a wall structure, the insertable housing 1 may further comprise a wall-locking feature. The wall-locking feature may be integrated into the grip feature 12 or around the grip feature 12. The wall-locking feature may be any type of locking feature such as, but not limited to, a key lock mechanism, an adhesive, or a press-fit design that allows the insertable housing to be fully secured within a wall structure.

Although the invention has been explained in relation to its preferred embodiment, it is to be understood that many other possible modifications and variations can be made without departing from the spirit and scope of the invention as hereinafter claimed.

What is claimed is:

1. A threaded insert with a replaceable nut element comprises:
   an insertable housing;
   a replaceable nut;
   a retaining mechanism;
   an attachment mechanism;
   the insertable housing comprises a grip feature, a housing tubular body, and a second recessed annular channel;
   the replaceable nut comprises a nut threading and a nut tubular body;
   the retaining mechanism comprises a keeper and a second retaining ring;
   the housing tubular body comprises an outer housing surface, an inner housing surface, a first open housing end, and a second open housing end;
   the nut tubular body comprises an outer nut surface, an inner nut surface, a first nut end, and a second nut end;
   the keeper comprises an annular body, a plurality of prongs, and a cylindrical cavity;
   the annular body comprises a first annular base and a second annular base;
   the cylindrical cavity comprises a cavity base;
   the grip feature being integrated around the outer housing surface;
   the nut threading being connected around the inner nut surface;
   the inner housing surface being positioned around the outer nut surface;
   the attachment mechanism being operatively coupled between the replaceable nut and the insertable housing, wherein the attachment mechanism is used to selectively prevent axial movement of the replaceable nut within the insertable housing;
   the retaining mechanism being operatively coupled between the replaceable nut and the insertable housing, wherein the retaining mechanism is used to selectively prevent rotational movement of the replaceable nut within the insertable housing;
   the plurality of prongs being radially connected around the first annular base;
   each of the plurality of prongs being positioned normal to the first annular base;
   the second retaining ring being attached around the inner housing surface, adjacent to the second open housing end;
   the second recessed annular channel being integrated around the inner housing surface, adjacent to the second open housing end;
   the second retaining ring being engaged into the second recessed annular channel;
   the cylindrical cavity traversing into the first annular base;
   the second nut end being positioned into the cylindrical cavity; and
   the second nut end being positioned offset from the cavity base by an empty-space clearance gap.

2. The threaded insert with a replaceable nut element as claimed in claim 1 comprises:
   the attachment mechanism comprises a plurality of housing protrusions, a plurality of nut protrusions, and a first retaining ring;
   the first retaining ring being attached around the inner housing surface, adjacent to the first open housing end;
   the plurality of housing protrusions being radially connected around the inner housing surface;
   the plurality of housing protrusions being positioned offset from the first retaining ring, opposite the first open housing end; and
   the plurality of nut protrusions being radially connected around the outer nut surface.

3. The threaded insert with a replaceable nut element as claimed in claim 2 comprises:
   wherein the insertable housing and the replaceable nut are arranged in an axial-locked configuration;
   the plurality of nut protrusions being positioned in between the first retaining ring and the plurality of housing protrusions; and
   each of the plurality of housing protrusions being positioned adjacent to a corresponding nut protrusion from the plurality of nut protrusions.

4. The threaded insert with a replaceable nut element as claimed in claim 2 comprises:
   the insertable housing further comprises a first recessed annular channel;
   the first recessed annular channel being integrated around the inner housing surface, adjacent to the first open housing end; and
   the first retaining ring being engaged into the first recessed annular channel.

5. The threaded insert with a replaceable nut element as claimed in claim 1 comprises:
   wherein the insertable housing and the replaceable nut are arranged in a rotationally-locked configuration;
   the attachment mechanism comprises a plurality of nut protrusions;
   the plurality of nut protrusions being radially connected around the outer nut surface;
   each of the plurality of nut protrusions being positioned in between a corresponding pair of prongs from the plurality of prongs; and
   the second annular base being positioned against the second retaining ring, opposite to the second open housing end.

6. The threaded insert with a replaceable nut element as claimed in claim 5 comprises:

the attachment mechanism further comprises a first retaining ring and a plurality of housing protrusions;
the first retaining ring being attached around the inner housing surface, adjacent to the first open housing end;
the plurality of housing protrusions being radially connected around the inner housing surface;
the plurality of housing protrusions being positioned offset from the first retaining ring, opposite the first open housing end; and
the first annular base being pressed against the plurality of housing protrusions, opposite to the first retaining ring.

7. A threaded insert with a replaceable nut element comprises:
an insertable housing;
a replaceable nut;
a retaining mechanism;
an attachment mechanism;
the insertable housing comprises a grip feature, a housing tubular body, and a second recessed annular channel;
the replaceable nut comprises a nut threading and a nut tubular body;
the housing tubular body comprises an outer housing surface, an inner housing surface, a first open housing end, and a second open housing end;
the nut tubular body comprises an outer nut surface, an inner nut surface, a first nut end, and a second nut end;
the attachment mechanism comprises a plurality of housing protrusions, a plurality of nut protrusions, and a first retaining ring;
the retaining mechanism comprises a keeper and a second retaining ring;
the keeper comprises an annular body, a plurality of prongs, and a cylindrical cavity;
the annular body comprises a first annular base and a second annular base;
the cylindrical cavity comprises a cavity base;
the grip feature being integrated around the outer housing surface;
the nut threading being connected around the inner nut surface;
the inner housing surface being positioned around the outer nut surface;
the attachment mechanism being operatively coupled between the replaceable nut and the insertable housing, wherein the attachment mechanism is used to selectively prevent axial movement of the replaceable nut within the insertable housing;
the retaining mechanism being operatively coupled between the replaceable nut and the insertable housing, wherein the retaining mechanism is used to selectively prevent rotational movement of the replaceable nut within the insertable housing;
the first retaining ring being attached around the inner housing surface, adjacent to the first open housing end;
the plurality of housing protrusions being radially connected around the inner housing surface;
the plurality of housing protrusions being positioned offset from the first retaining ring, opposite the first open housing end;
the plurality of nut protrusions being radially connected around the outer nut surface;
the plurality of prongs being radially connected around the first annular base;
each of the plurality of prongs being positioned normal to the first annular base; and
the second retaining ring being attached around the inner housing surface, adjacent to the second open housing end;
the second recessed annular channel being integrated around the inner housing surface, adjacent to the second open housing end;
the second retaining ring being engaged into the second recessed annular channel;
the cylindrical cavity traversing into the first annular base;
the second nut end being positioned into the cylindrical cavity; and
the second nut end being positioned offset from the cavity base by an empty-space clearance gap.

8. The threaded insert with a replaceable nut element as claimed in claim 7 comprises:
wherein the insertable housing and the replaceable nut are arranged in an axial-locked configuration;
the plurality of nut protrusions being positioned in between the first retaining ring and the plurality of housing protrusions; and
each of the plurality of housing protrusions being positioned adjacent to a corresponding nut protrusion from the plurality of nut protrusions.

9. The threaded insert with a replaceable nut element as claimed in claim 7 comprises:
the insertable housing further comprises a first recessed annular channel;
the first recessed annular channel being integrated around the inner housing surface, adjacent to the first open housing end; and
the first retaining ring being engaged into the first recessed annular channel.

10. The threaded insert with a replaceable nut element as claimed in claim 7 comprises:
wherein the insertable housing and the replaceable nut are arranged in a rotationally-locked configuration;
the attachment mechanism comprises a plurality of nut protrusions;
the plurality of nut protrusions being radially connected around the outer nut surface;
each of the plurality of nut protrusions being positioned in between a corresponding pair of prongs from the plurality of prongs; and
the second annular base being positioned against the second retaining ring, opposite to the second open housing end.

11. The threaded insert with a replaceable nut element as claimed in claim 10 comprises:
the attachment mechanism further comprises a first retaining ring and a plurality of housing protrusions;
the first retaining ring being attached around the inner housing surface, adjacent to the first open housing end;
the plurality of housing protrusions being radially connected around the inner housing surface;
the plurality of housing protrusions being positioned offset from the first retaining ring, opposite the first open housing end; and
the first annular base being pressed against the plurality of housing protrusions, opposite to the first retaining ring.

* * * * *